United States Patent [19]

Lambertson

[11] 4,245,955
[45] Jan. 20, 1981

[54] PHASE AND SPEED CONTROL SYSTEM

[75] Inventor: Carmon D. Lambertson, Dayton, Ohio

[73] Assignee: The Cessna Aircraft Company, Wichita, Kans.

[21] Appl. No.: 969,394

[22] Filed: Dec. 14, 1978

[51] Int. Cl.³ .................. B64C 11/50; F02D 25/02
[52] U.S. Cl. .................................. 416/34; 60/702; 361/244
[58] Field of Search .............. 416/34, 35; 60/700, 60/702; 361/243, 244; 318/314, 608

[56] References Cited

U.S. PATENT DOCUMENTS

| | | | |
|---|---|---|---|
| 1,911,876 | 5/1933 | Behrens | 60/702 |
| 3,206,641 | 9/1965 | Leeson et al. | 361/244 |
| 3,368,108 | 2/1968 | Helm | 361/244 |
| 3,689,175 | 9/1970 | Hartzell | 416/34 |
| 3,785,147 | 1/1974 | Leeson | 60/702 |
| 4,115,728 | 9/1978 | Buckner | 318/314 X |

Primary Examiner—James J. Gill
Attorney, Agent, or Firm—Biebel, French & Nauman

[57] ABSTRACT

A phase and speed control system for synchronizing the speed and controlling the phase relationship between a pair of aircraft engines, each engine having associated therewith a centrifugal governor, includes a phase comparator circuit which provides a pulse width modulated signal only to the governor coil of the engine having the slower initial rotational velocity. A variable delay on one input of the phase comparator may be adjusted to determine the relative rotational phase relationship between the engines.

10 Claims, 3 Drawing Figures

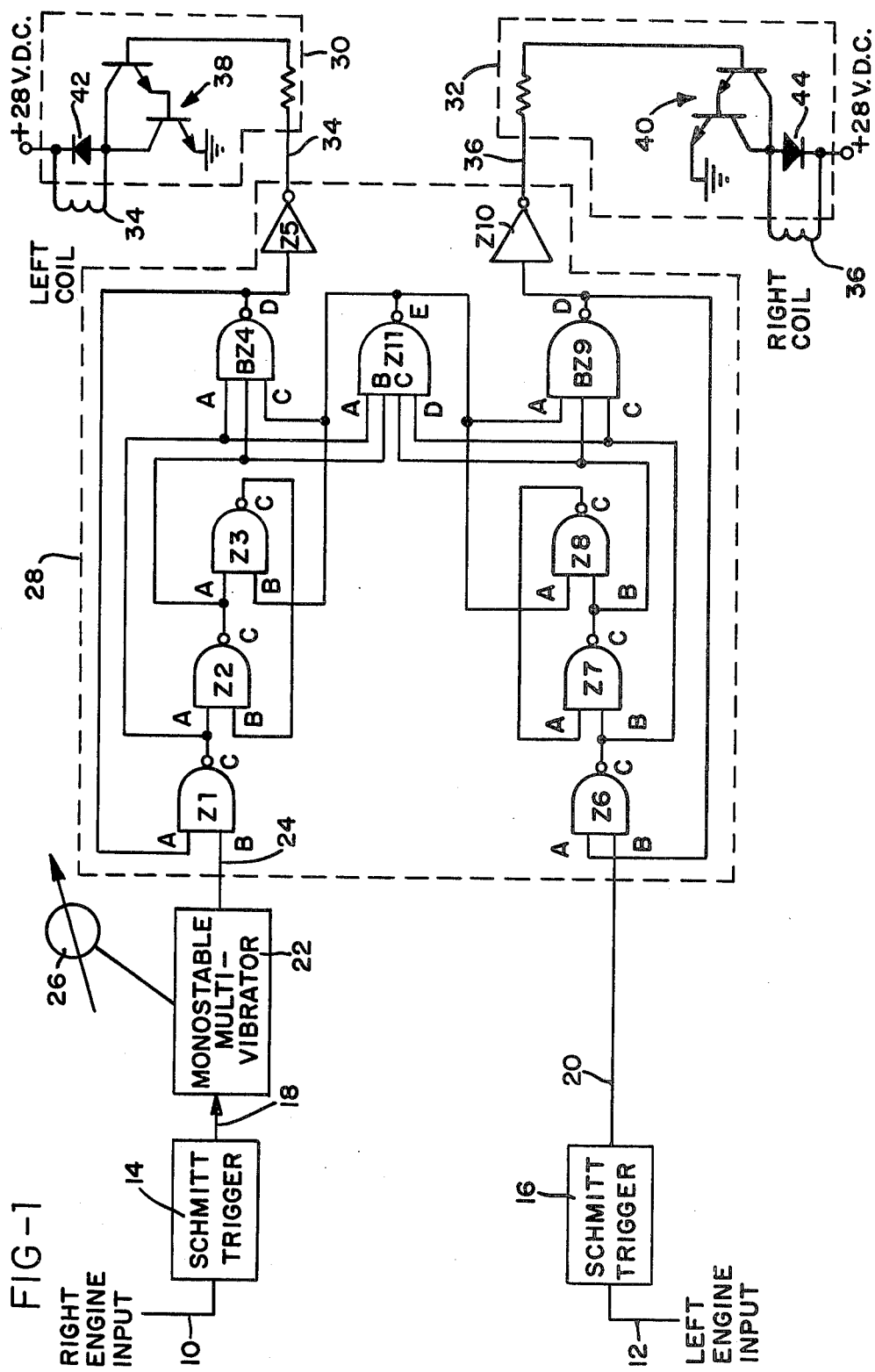

PHASE AND SPEED CONTROL SYSTEM

BACKGROUND OF THE INVENTION

The present invention relates to a phase and speed control system for synchronizing the rotational velocity and relative rotational phase of a pair of prime movers and, more particularly, to such a system for synchronizing speed and controlling the phase relationship between a pair of aircraft engines, each of said pair of aircraft engines having associated therewith a centrifugal governor.

It is highly desirable that the rotational velocity of the engines in a twin aircraft be synchronized in order to avoid excessive vibration. If the engines are operated at slightly differing speeds, vibrations generated by each engine alternately add to and subtract from the vibrations produced by the other engine to create vibrational "beats" which occur at a frequency equal to the difference in frequency between the vibrations generated by the engines. Even when the engines are synchronized precisely in speed, vibrations generated by each of the engines will be additive and subtractive at various points in the aircraft. This may result, for example, in the rearward, passenger portion of a craft experiencing a great deal more vibration and noise than the cockpit of the craft. By adjusting the relative rotational phase between the engines, it is possible to vary the position in the aircraft of the vibrational nodes such that the passangers in the craft may be provided with the smoothest and quietest conditions possible. Alternatively, when no passengers are in the aircraft, the rotational phase relationship between the engines may be adjusted to provide minimum noise and vibration in the cockpit.

In order to provide precise engine speed control, it is common to utilize a variable pitch propeller with the speed of the engine driving the propeller being adjusted by varying the pitch of the propeller blades. Adjusting propeller pitch, it will be appreciated, causes a corresponding change in the loading on the driving engine, with the result that the speed of the engine is adjusted. Typically, the pitch of the propeller blades is controlled by a centrifugal governor driven by the engine.

One such governor, known as a magnetic ball head governor, includes rotating flyweights which are connected by a spring biased linkage to a hydraulic valve. Hydraulic fluid passing through the valve is supplied to the hub of the propeller, through a hydraulic actuator mechanism, and determines the propeller pitch. Adjustment of the mechanical linkage that provides spring bias to the flyweights results in a coarse speed setting. As shown in U.S. Pat. Nos. 2,890,877, issued June 16, 1959, to Straznickas, and 3,955,165, issued May 4, 1976, to Stubbs et al, such ball head governors also typically include an electromagnetic coil which, when energized, alters the position of the flyweights during rotation. The flyweights of some governors are magnetized, in which case they are either attracted or repelled in dependence upon the direction of current through the electromagnetic coil. Other governors have non-magnetized flyweights, in which case they are attracted to the coil regardless of the direction of current. The level of current supplied through the electromagnetic coil in the ball head governor is selected to provide a fine adjustment of the speed of the engine.

A number of speed and phase control systems, incorporating ball head governors or similar governor mechanisms, have in the past been utilized to control the engine speed and relative phase in multi-engine aircraft. One such control system is disclosed in U.S. Pat. No. 2,232,753, issued Feb. 25, 1941, to Wilson. The Wilson system incorporates mechanical switches which, through a relay system, control hydraulically the pitch of a propeller driven by a slave engine to synchronize the slave engine speed and phase with that of a master engine. Mechanical switching arrangements are subject to wear and, therefore, are inherently unreliable. Additionally, the response time and accuracy of such systems may not be sufficient in all motor control applications.

U.S. Pat. No. 3,689,175, issued Sept. 5, 1970, to Hartzell et al, discloses a system for phase and speed control of aircraft engines in which the speed and phase relationship of a slave engine is compared photo-optically to that of a master engine. A strobe lamp is strobed in synchronization with the rotation of the master engine and a slotted wheel, driven by the slave engine, is rotated adjacent to the strobe lamp. A photo-optical transducer on the opposite side of the slotted wheel senses the relative speed and phase differences between the slave engine and the master engine and adjusts a potentiometer which, in turn, controls a d.c. current applied to the control coil in the ball head governor.

U.S. Pat. No. 3,367,110, issued Feb. 6, 1968, to Lesson, discloses a system for controlling the speed and phase relationship between a slave engine and a master. The Lesson system is a digital system in which tachometer output pulses from the master engine and the slave engine are compared and pulse width modulated signals applied directly to the governor control coil in the slave engine governor. The response time of the coil is such that the governor does not react immediately to each pulse supplied to the coil, but rather responds to the average coil current. By adjusting the pulse width of the pulses applied to the governor coil, therefore, the average current is adjusted and control of the governor provided without the need for a digital-to-analog converter arrangement.

All of the control systems discussed above arbitrarily assign the status of slave engine to one or more of the engines and synchronize the speed and phase of the slave or slaves with an engine selected as the master engine. It will be appreciated that such an arrangement is somewhat undesirable in that should a malfunction occur in the master engine and the master engine shut down, the control system will then attempt to stop all of the slave engines.

U.S. Pat. No. 3,785,147, issued Jan. 15, 1974, to Leeson, discloses a digital synchronizing and phase control system or a pair of aircraft engines in which the engines are speed-synchronized and phase-controlled without assigning slave and master status to the engines. Tachometer output pulses from the engines are phase-compared and complementary pulse width modulated control signals are generated for application to the electromagnetic coils in the governors on both of the engines. Phase adjustment between the engines is accomplished by adding a variable d.c. biasing current to the pulse width modulated signal applied to one of the governor coils. Since both of the governor coils receive signals, the Leeson system may, in certain situations, cause the engine running at the higher initial rotational velocity to increase its speed, prior to obtaining speed synchronization. For example, both of the engines controlled by the Leeson system may be accelerated when system operation is initiated. As can be appreciated, this is highly undesirable in that the faster running of the engines may be initially operating at the upper safe operating speed of the engine and an engine overspeed condition may result. Additionally, should one of the engines fail, the system of Leeson will attempt to slow down the other of the engines. This is also highly undesirable. Finally, the circuitry used for controlling the phase between the engines is analog in nature and its operation may therefore be adversely affected by changes in ambient conditions, such as temperature.

Accordingly, it is seen that there is a need for a simple, reliable speed and phase control system for controlling a pair of aircraft engines in which both speed and phase control are accomplished digitally, in which engine overspeed conditions are precluded, and in which the operation of either of the aircraft engines is unaffected in the event that the other engine should be shut down.

SUMMARY OF THE INVENTION

A phase and speed control system for synchronizing the rotational velocity and relative rotational phase of a pair of prime movers, each prime mover having associated therewith a tachometer providing tachometer output pulses and a rotational velocity governor, said governor including a governor coil which adjusts the governor to determine the rotational velocity of the prime mover in dependence upon the average current through the governor coil, includes first and second means for receiving tachometer output pulses and for providing first and second synchronization pulse signals in response to the tachometer output pulses. A delay means is responsive to the first means for receiving tachometer output pulses and provides an adjustably delayed first synchronization pulse signal. A comparator means is responsive to the delayed first synchronization pulse signal and to the second synchronization pulse signal for providing an error signal to the governor coil of the prime mover having the slower initial rotational velocity. The error signal is a pulse width modulated signal having pulses of a duration proportional to the delay between synchronization pulse signals received by the comparator means. The pulse width modulated signal pulses provide an average current through the governor coil sufficient to hold the pair of prime movers in speed synchronization. The delay means provides an adjustable control of the relative rotational phase of the pair of prime movers.

The comparator means may comprise a phase comparator means responsive to the synchronization pulse signals for providing first and second non-complementary governor control signals. The comparator means may further comprise coil driver means responsive to the governor control signals for providing the error signal to the one of the pair of prime movers having the slower initial rotational velocity. The first and second means for receiving tachometer output pulses may each comprise a squaring amplifier, with the delay means comprising an adjustable monostable multivibrator.

Accordingly, it is an object of the present invention to provide a speed synchronization system for a pair of prime movers, each prime mover having associated therewith a tachometer providing tachometer output pulses and a rotational velocity governor, including a governor coil, which adjusts the governor to determine the rotational velocity of the prime mover in dependence upon the average current through the governor coil, and in which phase comparison of the tachometer output pulses results in non-complementary pulse width modulated governor control signal outputs; to provide such a system in which a pulse width modulated signal is applied only to the governor coil of the slower of the pair of prime movers; to provide such a system in which tachometer output pulses from one of the pair of prime movers are adjustably delayed to provide phase control; and to provide such a system in which all control circuitry operates digitally.

BRIEF DESCRIPTION OF THE DRAWINGS

FIG. 1 is a block diagram illustrating an embodiment of the system of the present invention.

DETAILED DESCRIPTION OF THE PREFERRED EMBODIMENT

Figure 2A:
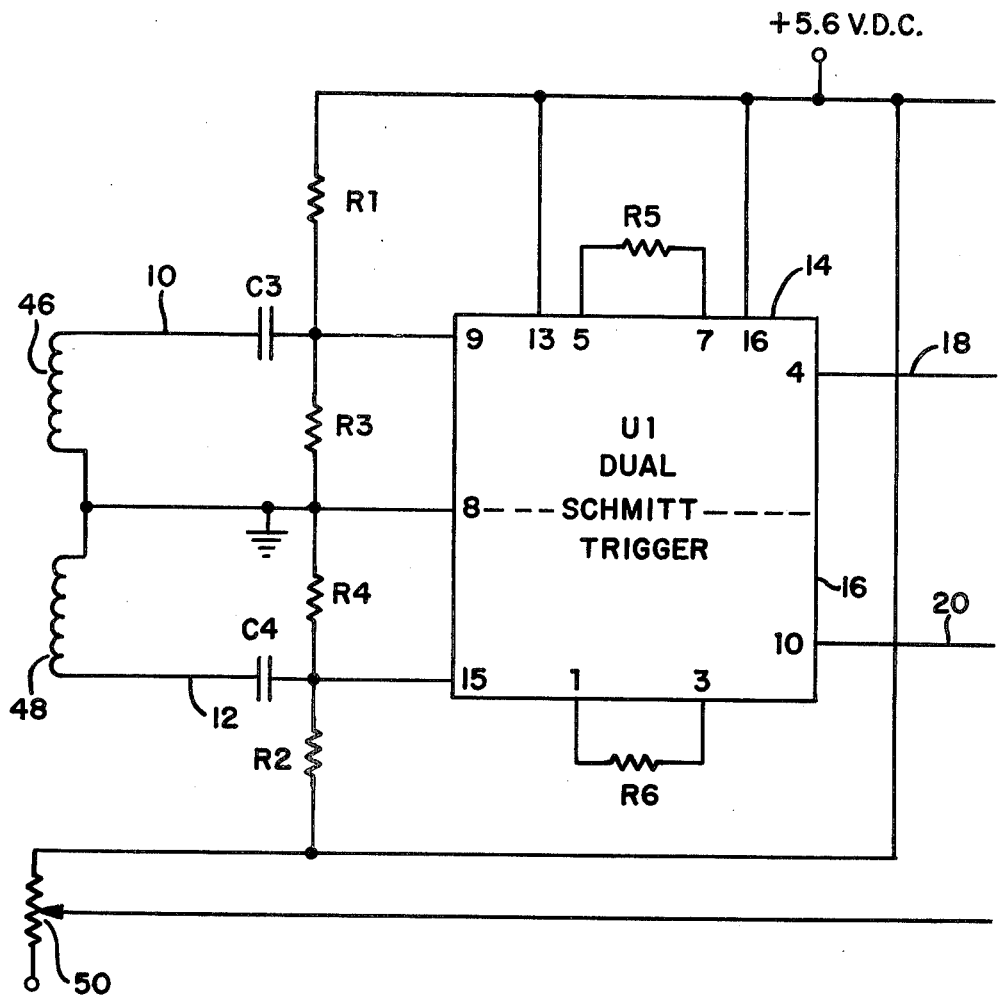
FIG. 2(A) and 2(B), when assembled with FIG. 2(A) to the left of 2(B), illustrate the circuit of FIG. 1 in greater detail.

Reference is now made to FIG. 1 which illustrates schematically an embodiment of the phase and speed control system of the present invention. This system provides synchronization of the rotational velocity and control of the relative rotational phase between a pair of prime movers, such as aircraft engines. Each prime mover has associated therewith a tachometer which provides tachometer output pulses at the frequency of engine rotation. These tachometers may be of any known design, including vibrational tachometers, as long as they provide pulse related in frequency to the rotational speed of the engines. Tachometer output pulses from the right engine are provided on line 10, while tachometer output pulses from the left engine are provided on line 12.

A first tachometer input means for receiving tachometer output pulses from the right engine tachometer includes a squaring amplifier such as Schmitt trigger 14. Similarly, a second tachometer input means for receiving tachometer output pulses from the left engine tachometer includes a squaring amplifier such as Schmitt trigger 16. Schmitt trigger 14 provides a first synchronization pulse train signal on line 18, while Schmitt trigger 16 provides a second synchronization pulse train signal on line 20. These synchronization pulse train signals correspond in frequency to the tachometer input pulses, i.e., one pulse per engine revolution, but are free of any noise present in the tachometer output pulses which would adversely affect the operation of the control system.

The first synchronization pulse train signal on line 18 is applied to an adjustable delay means, including monostable multivibrator 22, which provides a delayed first synchronization pulse signal on its output 24. The duration of the delay provided by the monostable multivibrator 22 may be adjusted manually by the aircraft pilot by means of adjusting knob 26 which sets the resistance of a variable resistor forming part of the circuit 22.

A comparator means, responsive to the delayed first synchronization pulse signal on line 24, and to the second synchronization on line 20, includes a phase comparator means 28 and coil driver means 30 and 32. The comparator means provides a pulse width modulated error signal to the governor coil of the prime mover having the slower initial rotational velocity. Coil 34 is the governor coil in a governor associated with the left enngine, while coil 36 is the governor coil in a governor associated with the right engine. The governors will typically comprise magnetic ball head governors of the type described in U.S. Pat. No. 3,955,165, issued May 4, 1976, to Stubbs et al, and U.S. Pat. No. 2,898,877, issued June 16, 1959, to Straznickas. The governors are of the type including non-magnetized flyweights, with the coil arranged such that an increase in current through the governor coil results in a corresponding increase in the speed of the engine associated with the governor.

The error signal supplied to the coil of the prime mover having the slower initial rotational velocity is a pulse width signal consisting of pulses of a duration which is proportional to the delay between the synchronization pulses received on lines 20 and 24. The pulse width modulated signal pulses provided to the governor coil supply an average current through the governor coil which is sufficient to hold the prime mover in speed synchronization. It should be noted that the circuit always provides a signal only to the governor coil associated with the engine having the slower initial rotational velocity. Therefore, should one of the engines be shut down due to engine malfunction, the control system of the present invention will not attempt to slow down the other of the pair of engines being controlled. Additionally, since the initially faster rotating engine governor coil receives no error signals, the governor does not cause the faster running engine to increase its rotational velocity and exceed the engine speed rating. The phase comparator means 28 provides first and second non-complementary governor control signals on lines 34 and 36, respectively, to the coil driver means which include Darlington amplifiers 38 and 40. When speed synchronization is attained, the coil driver associated with the engine having a tendency to rotate at the slower rate will receive a pulse width modulated signal of a duration sufficient to alter the position of the flyweights appropriately and maintain relative speed synchronization between the engine.

The adjustment of the rotational phase relationship between the engines is made by setting the delay provided by the multivibrator 22. It will be appreciated that, at synchronization, the relative timing between pulses on lines 20 and 24 will be unaffected by the delay setting of multivibrator 22. Should the delay be changed, the phase relationship between pulses on lines 20 and 24 will be altered with the result that the speed of one engine will be adjusted until the same relative phase relationship between the pulses on lines 20 and 24 is attained. At the new delay setting, of course, the relative phase relationship between tachometer pulses 10 and 12 will differ from that prior to the adjustment of delay 22.

The phase comparator circuit 28 operates as follows. It is assumed that outputs 34 and 36 are initially 0 and that initially a 1 is provided on inputs 24 and 20, which inputs are responsive to negative-going synchronization pulse train signals. Since the outputs of inverters Z5 and Z10 are 0, their respective inputs are a 1 state. Thus a 1 is provided at the A input of Z1 and at the A input of Z6. Since both inputs of NAND gates Z1 and Z6 are 1, the outputs of these gates are 0. A 0 is thus supplied to the A input of gate Z4 and the A input of Z9. The 0 outputs of gates Z1 and Z6 also force the outputs of gates Z2 and Z7 to be 1, as well as a 1 on the output of gate Z11. Therefore, the gate Z3 and the gate Z8 will initially have 0 outputs.

Assuming that the right engine is operating at a higher rotational velocity and, further, that a synchronization pulse is provided on line 24 prior to a synchronization pulse being provided on line 20, a 1-to-0 transition at the B input of gate Z1 will cause gate Z1 to provide a 1 output. The inputs to NAND gate Z4 are now all 1's and, therefore, its output will be 0. This places a 0 on the A input of gate Z1, in turn, holds a 1 on the output of gate Z1 even after termination of the synchronization pulse and return of the line 24 to a 1 logic level. Since the output of gate Z4 is now 0, inverter Z5 provides a 1 output on line 34. Darlington amplifier 38 is therefore switched on, and power is applied through the amplifier 38 to the coil 34 in the speed control governor on the left engine.

A tachometer pulse from the left engine is now supplied to line 12 and a 1-to-0 transition occurs on line 20. Gate Z6, therefore, provides a 1 output, thus causing the output of gate Z11 to be 0. This, in turn, provides a 0 input to the C input of gate Z4 and the B input of gate Z3, returning gates Z1, Z2, Z3, and Z4 to their initial logic states.

As the output of gate Z2 goes to a 0 level, gate Z11 alters its output to a 1 logic level. Gates Z6, Z7, Z8, and Z9 are also returned to their initial logic states. Thus it can be seen that a pulse of a duration proportional to the phase lag between pulses received on lines 20 and 24 will be applied to the governor coil of the engine which is rotating initially at the slower velocity. The governor coil of the faster of the pair of engines is not energized. If the engines should, by chance, be set initially precisely in speed and phase synchronization, no pulse width modulated error signal will be applied to either governor coil.

Diodes 42 and 44 are placed in parallel with the governor coils such that each of the coils will be effectively shorted as the coils are switched off and generate reverse voltages, thereby increasing the speed with which governor coil current decays to 0.

Figure 2B:
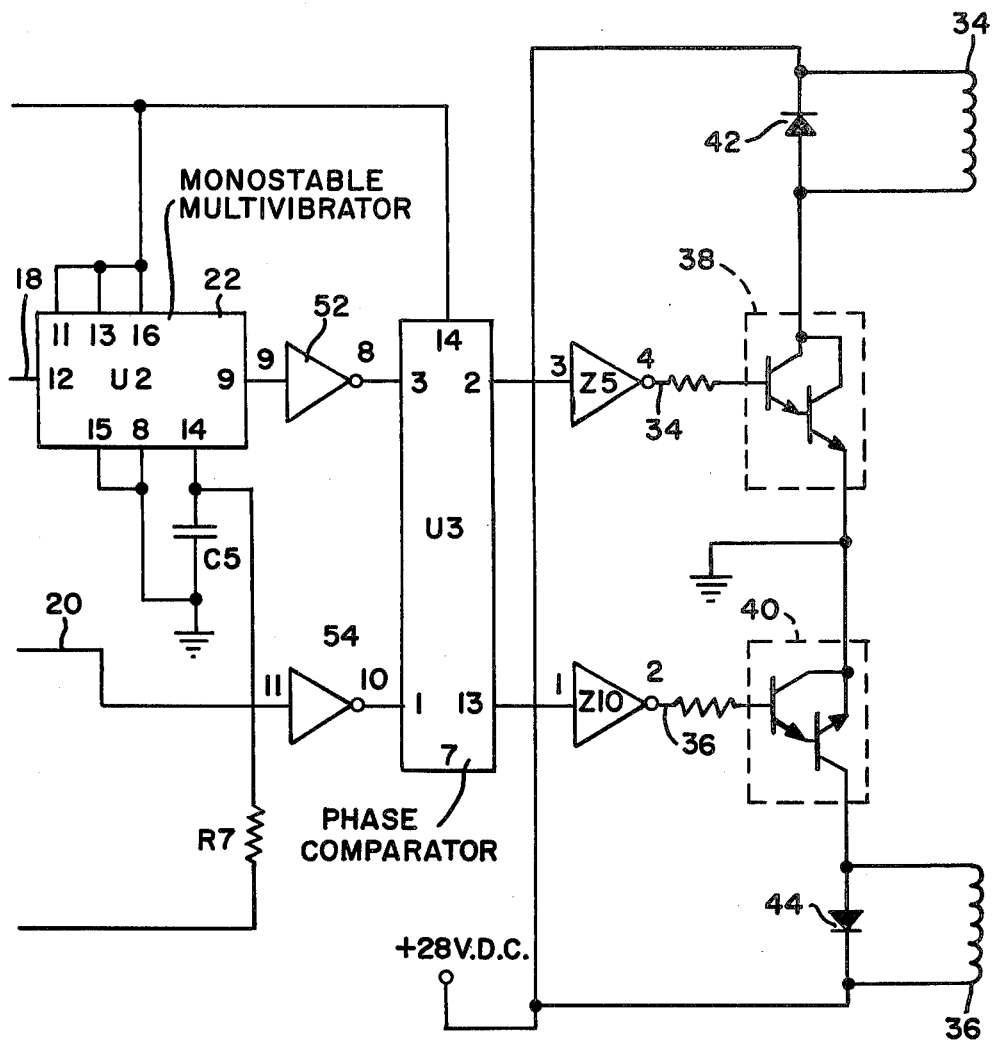

Reference is now made to FIGS. 2(A) and 2(B) which, when assembled with FIG. 2(A) to the left of FIG. 2(B), illustrate schematically the embodiment of FIG. 1 in greater detail. Much of the circuitry is identical to that illustrated in FIG. 1 and, therefore, has been referenced with the same numerals. Coils 46 and 48 are magnetic pick-up coils which form a part of the tachometers associated with the right and left engines, respectively. These coils will provide an output tachometer pulse to their respective output lines once during each tachometer rotation.

Resistor 50 is manually adjustable by means of control knob 26 (FIG. 1) and provides for adjustment of the monostable multivibrator delay. A dual Schmitt trigger integrated circuit U1 provides the necessary tachometer pulse shaping. The phase comparator 28 includes integrated circuit U3. Inverters 52 and 54 are provided at the inputs of phase comparator circuit U3 in order that the appropriate pulse polarity might be provided for circuit operation. The 5.6 volt and 28 volt direct current signals are derived from the aircraft power supply by standard power supply circuitry.

The following circuit components have been used in one embodiment of the invention, constructed according to FIGS. 2(A) and 2(B).

| R1, | R2 | 22 | Kohm | ¼W | 5% Res. |
|---|---|---|---|---|---|
| R3, | R4 | 15 | Kohm | ¼W | 5% Res. |
| R5, | R6 | 10 | Kohm | ¼W | 5% Res. |
|  | R7 | 5.1 | Kohm | ¼W | 5% Res. |
| R8, | R9 | 470 | ohm | ¼W | 5% Res. |
| C3, | C4 | 1 | mfd | 35v | Cap. |

-continued

| | | | | |
|---|---|---|---|---|
| | C5 | .33 mfd | 35v | Cap. |
| | U1 | MC14583BCP | | Dual Schmitt Trigger |
| | U2 | MC14538BCP | | Monostable |
| | U3 | MC4344L | | Phase Comparator |
| Z5, | Z10 | MC54LS04 | | Hex Inverter |
| 38, | 40 | MJE800 | | Darlington Transistor |
| 42, | 44 | 1N4002 | | Power Diode |
| | 50 | 50 Kohm | | Variable Resistor |

It will be appreciated that numerous variations upon the circuitry disclosed herein may be made within the scope of the present invention. For instance, in some engine control applications, it may be unimportant to provide adjustable control of the phase relationship between the engines. In such applications, the tachometer output pulses from the tachometers associated with the engines, after suitable pulse shaping, may be applied directly to the comparator circuit. While such an arrangement does not provide phase control, nevertheless, the engine speeds of the engines being controlled will be precisely synchronized. With such a circuit, as with those described above, an error signal will be applied only to the governor coil of the engine having the slower rotational velocity.

While the form of apparatus herein described constitutes a preferred embodiment of the invention, it is to be understood that the invention is not limited to this precise form of apparatus, and that changes may be made therein without departing from the scope of the invention.

What is claimed is:

1. A phase and speed control system for synchronizing the rotational velocity and controlling relative rotational phase between a pair of prime movers, each prime mover having associated therewith a tachometer providing tachometer output pulses and a rotational velocity governor, said governor including a governor coil which adjusts the governor to determine the rotational velocity of the prime mover in dependence upon the average current through said governor coil, comprising:
   first and second means for receiving said tachometer output pulses and for providing first and second synchronization pulse signals in response to said first and second tachometer output pulses, respectively,
   delay means, responsive to said first means, for providing an adjustably delayed first synchronization pulse signals, and
   comparator means, responsive to said delayed first synchronization pulse signal from said delay means and to said second synchronization pulse signal, for providing an error signal to the governor coil of the prime mover having the slower rotational velocity, said error signal being a pulse width modulated signal having pulses of a duration proportional to the delay between synchronization pulse signals received by said comparator means, said pulse width modulated signal pulses providing an average current through said governor coil sufficient to hold said pair of prime movers in speed synchronization and said delay means providing adjustable control of the relative rotational phase of said pair of prime movers.

2. The phase and speed control system of claim 1 in which said comparator means comprises phase comparator means, responsive to said synchronization pulse signals, for providing first and second non-complementary governor control signals, and coil driver means, responsive to said governor control signals, for providing said error signal to the one of said pair of prime movers having the slower initial rotational velocity.

3. The phase and speed control system of claim 1 in which said first and second means each comprises a squaring amplifier.

4. The phase and speed control system of claim 1 in which said delay means comprises an adjustable monostable multivibrator.

5. A phase and speed control system for synchronizing the speed and controlling the phase relationship between a pair of aircraft engines, each of said pair of aircraft engines having associated therewith a tachometer providing tachometer output pulses and a centrifugal governor, including a governor coil, for controlling the pitch of an aircraft propeller driven by the engine associated therewith in response to the current through the coil, comprising:
   first tachometer input means, responsive to tachometer pulses from the tachometer associated with the first of said pair of engines, for providing a first synchronization pulse train signal,
   second tachometer input means, responsive to tachometer pulses from the tachometer associated with the second of said pair of engines, for providing a second synchronization pulse train signal,
   adjustable delay means responsive to said first synchronization pulse train signal from said first tachometer input means, for providing a delayed synchronization pulse train signal,
   phase comparator means, responsive to said delayed synchronization pulse train signal and said second synchronization pulse train signal for providing a pulse width modulated governor control signal output, and
   governor coil driver means, responsive to said control signal output for providing a pulse width modulated signal only to the governor coil of the slower of said pair of engines, whereby said engines are brought into speed synchronization by adjustment of the pitch of the propeller driven by the slower of said pair of engines and the relative phase between said pair of engines may be adjusted by means of said adjustable delay means.

6. The phase and speed control system of claim 5 in which said phase comparator means provides a governor control signal output which is pulse width modulated in accordance with the phase relationship between said pulse train signals supplied thereto.

7. The phase and speed control system of claim 6 in which said adjustable delay means comprises an adjustable monostable multivibrator.

8. The phase and speed control system of claim 6 in which said first and second tachometer means each comprises a squaring amplifier.

9. The phase and speed control system of claim 6 in which governor coil driver means comprises a pair of Darlington amplifiers, each of said pair of amplifiers connected to a respective one of said governor coils associated with said aircraft engines.

10. A speed control system for synchronizing the rotational velocities of a pair of prime movers, each prime mover having associated therewith a tachometer providing tachometer output pulses and a rotational velocity governor, said governor including a governor coil which adjusts the governor to determine the rotational velocity of the prime mover in dependence upon the average current through said governor coil, comprising:
  first and second means for receiving said tachometer output pulses and for providing first and second output pulse signals in response thereto, respectively, and
  comparator means, responsive to said first and second output pulse signals, for providing an error signal to the governor coil of the prime mover having the slower rotational velocity, said error signal being a pulse width modulated signal having pulses of a duration proportional to the delay between said first and second output pulse signals received by said comparator means, said pulse width modulated signal pulses providing an average current through said governor coil sufficient to hold said pair of prime movers in speed synchronization.

* * * * *